Nov. 19, 1935.     C. G. SUITS     2,021,753
ELECTRIC CIRCUIT CONTROL MEANS
Filed May 26, 1932
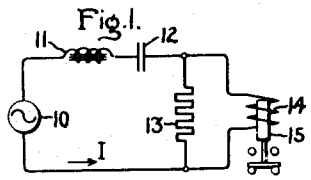
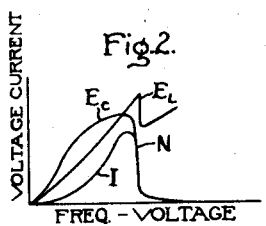
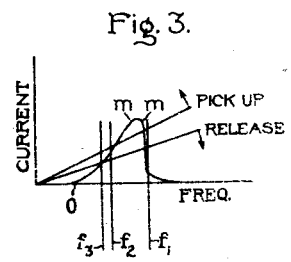
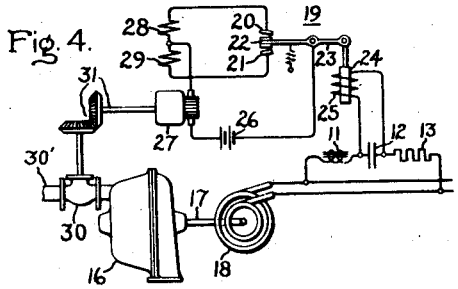
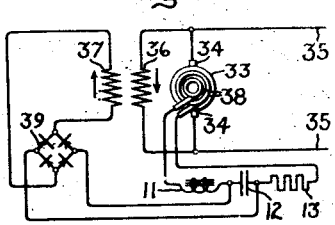
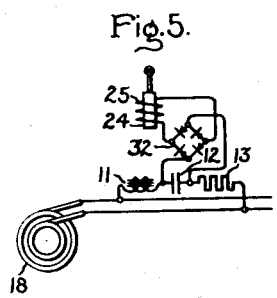
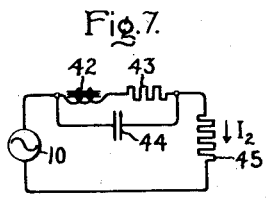
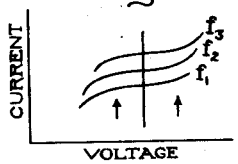
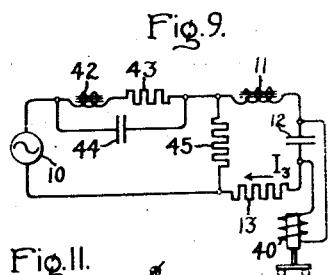
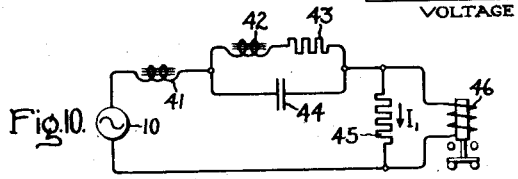
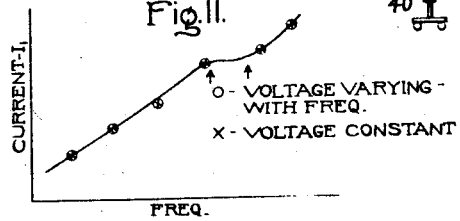
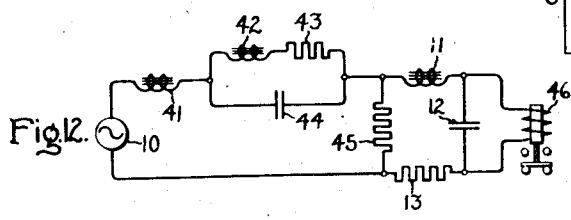
Inventor:
Chauncey G. Suits,
by Charles E. Tulla
His Attorney.

Patented Nov. 19, 1935

2,021,753

UNITED STATES PATENT OFFICE 2,021,753

ELECTRIC CIRCUIT CONTROL MEANS

Chauncey G. Suits, Schenectady, N. Y., assignor to General Electric Company, a corporation of New York Application May 26, 1932, Serial No. 613,694

15 Claims. (Cl. 171—119)

My invention relates to electric circuit control means and more particularly to frequency sensitive control means for the regulation and control of electric circuits and rotating machines.

There are certain applications in the regulation and control of electric circuits and rotating machines which require a frequency responsive means which functions in response to either voltage or frequency provided the ratio between these quantities is proportional. There are also certain other electric applications which require frequency responsive means but the electric type of this class of apparatus is usually affected by variations in the voltage applied thereto so that the frequency response is not independent of voltage.

In accordance with my invention I employ circuit elements having a non-linear volt-ampere characteristic arranged in various combinations with capacitance and resistance elements in an electric network energized from an alternating current source in such a manner that an output voltage is obtained which varies critically in accordance with variations in the frequency of the source of supply. Electric circuits comprising circuit elements of inductance, capacitance and resistance which depend upon current are distinguished by non-linear volt-ampere characteristics. Throughout the specification and claims non-linear element or circuit will be used to indicate an element, circuit, or branch circuit having a non-linear volt-ampere characteristic for effective values of alternating current. Certain unusual resonance effects occur in circuits of this type employing an iron core inductance with a substantially closed core. These effects are strikingly different from the well known properties of resonance circuits where the flux path of the inductance element is almost wholly in air. In the well known series resonant linear circuit of inductance, capacitance and resistance the voltage across the inductance is equal and opposite to the voltage across the capacitance throughout the voltage cycle. Similarly, for the parallel resonant linear circuit the inductive current and capacitive current are equal throughout the current cycle. For the non-linear circuit, with an inductance variable with current in combination with a capacitance, the condition of resonance is satisfied for only a limited portion of the voltage or current cycle. Resonance in non-linear circuits is thus regarded as partial and because of this characteristic the terminology "non-linear resonance" is employed in the claims to distinguish the subject matter of the claims from linear circuits of the same general type.

It is an object of my invention to provide an improved type of frequency sensitive electric circuit control means which shall be economical and rugged in structure, highly sensitive, readily adjustable, and with an accuracy independent of mechanical factors.

It is another object of my invention to provide an improved type of relay mechanism which shall be sensitive to variations in frequency and independent of variations in the voltage applied thereto.

It is a further object of my invention to provide an improved type of electric circuit control means which shall be operative in accordance with either the frequency or voltage applied thereto when the frequency varies in proportion to the voltage.

My invention will be better understood from the following description taken in connection with the accompanying drawing and its scope will be pointed out in the appended claims.

In the drawing, Fig. 1 is a diagrammatic illustration of an elementary series-type non-linear circuit arrangement embodying my invention; Figs. 2 and 3 are illustrative curves to aid in understanding operating characteristics of various embodiments of my invention; Fig. 4 is an application of an embodiment of my invention as applied in regulating the speed of a prime mover; Fig. 5 is a modification of the arrangement illustrated in Fig. 4; Fig. 6 is an application of an embodiment of my invention as applied in regulating a direct current dynamo electric machine; Fig. 7 is a diagrammatic illustration of an elementary parallel-type non-linear circuit arrangement embodying my invention; Fig. 8 is an illustrative curve for explaining the operating characteristics of the elementary circuit arrangement shown in Fig. 7; Fig. 9 is an embodiment of my invention utilizing a parallel and a series-type non-linear circuit in combination; Fig. 10 is another embodiment of my invention utilizing a series-parallel type of non-linear circuit; Fig. 11 is an illustrative curve for explaining an operating characteristic of the circuit arrangement of Fig. 10, and Fig. 12 is a modification of the arrangement illustrated in Fig. 10.

Referring to Fig. 1 of the drawing, 10 indicates a variable frequency source of alternating voltage which is connected to energize an electric network comprising a saturable inductance 11, a capacitance 12, and a resistance 13, connected in series relation across the source 10. An electro-responsive device or relay mechanism comprising a winding 14 and a cooperating member or armature 15 is connected to be energized in accordance with the voltage across the resistance 13 but it will be evident from the discussion following that it may equally well be connected across the capacitance 12 or in series with the capacitance, inductance and resistance. It may also be connected across the inductance 11 but this is not as desirable for the reasons hereinafter pointed out.

When the voltage of the source 10 varies in proportion to the frequency the curves of Fig. 2 are obtained for the circuit of Fig. 1. In Fig. 2, the series current and voltages across the different elements of the circuit are plotted as functions of the variable applied voltage which is proportional to frequency. It will be observed that a variation of these quantities with frequency bears a rough analogy to the change in the same quantities for a linear circuit with the exception that there is a region wherein a critical change takes place from a resonant condition to a dissonant condition or vice versa. In general, the change in current I, the change in inductance voltage $E_L$, or the change in capacitance voltage $E_c$, is sufficiently great to allow a relay, contactor or other electro-responsive mechanism to be turned on and off at a critical frequency.

Consider the arrangement illustrated in Fig. 1 in which the winding 14 of the relay mechanism is energized in parallel with the resistance 13. The voltage applied to the relay from the resistance will vary in the manner indicated by the curve I of Fig. 2 which has been replotted in Fig. 3. For the armature and solenoid alone the voltage required to "pick up" or "release" the armature is approximately proportional to frequency. It may be seen, therefore, that if the frequency increases from a small value, the solenoid is energized and the armature is picked up at the frequency $f_2$, and remains in this condition until the frequency exceeds $f_1$. For decreasing frequency, the armature is again picked up at the frequency $f_1$, and released at the frequency $f_3$, which differs from the frequency $f_2$, by a small amount. When the relay is energized in parallel with the capacitance of the same series circuit, it may be seen from similar considerations that the solenoid will be energized for all frequencies less than the critical frequency for the circuit. The third possibility, that of using the voltage across the inductance 11 to actuate the relay, is not very suitable since the change in inductive voltage in the critical region is relatively small due to the saturation property of this element.

In a particular circuit of the type shown in Fig. 1 observations were taken in which the critical region occurred at a frequency of approximately 61 cycles which may be taken to represent the frequency $f_1$ of Fig. 3. For frequencies between 50 and 61 cycles the current in the circuit was a maximum indicated by the region mm. For frequencies less than 50 the current decreased in a somewhat linear manner to zero. In addition to the rapid change in magnitude of the current at the critical frequency there is a corresponding rapid change in phase of the current in the same region. Thus for frequencies higher than 61 cycles, with the circuit constants of the particular circuit shown, the current-voltage phase relations are those of an inductive circuit. For frequencies lower than 61 cycles the phase relations are those of a capacitive circuit. It was noted that the frequency for which the rapid rise in current takes place depends primarily upon the saturable inductance and is not critical in resistance or capacitance. The critical frequency was found to vary approximately linearly with the number of turns of the inductance. On the other hand, the rate of change of current, that is, the steepness of the curve in the critical region, depends primarily upon the value of the resistance in the circuit. For greater resistance, a less steep characteristic is had, tending in the limit toward a linear circuit. It has been found that this characteristic critical behaviour to frequency is a very reliable and reproducible type of phenomena which, since it depends upon the characteristics of the iron, may reasonable be expected to be very constant for long periods of time. No temperature effects were measurably present.

In Fig. 4 I have shown an application of an embodiment of my invention utilizing the frequency sensitive circuit of Fig. 1 in a frequency control system for rotating machines. A prime mover 16, which may be a steam turbine or similar fluid operated device, as illustrated, or a rotating direct-current or alternating current dynamo-electric machine, is mechanically connected by means of a shaft 17 to operate a pilot generator 18 of the alternating current type for producing a voltage which varies proportional to the frequency or the speed of the prime mover. The series circuit illustrated in Fig. 1, which comprises the saturable inductance 11, capacitance 12 and resistance 13, is connected to be energized in accordance with the voltage of generator 18. The voltage across the capacitance 12 is utilized in this case instead of the resistance 13 to control an electro-responsive device 19 which is utilized to effect control of the speed control mechanism of the prime mover 16.

The electro-responsive device 19 is shown as a contact-making voltmeter comprising a pair of fixed contacts 20 and 21 and a cooperating movable contact 22 which is carried by an arm 23. The arm 23 is actuated by an electro-magnetic device comprising an armature 24 suitably connected thereto and controlled by a winding 25. The winding 25 is connected across the capacitance 12. The contacts 20, 21, and 22 are connected in an electric circuit including a source of current 26 to control a reversible motor 27 by means of its field windings 28 and 29 which are arranged to be energized selectively. The motor 27 is connected to actuate the speed control mechanism of the prime mover, and in the fluid energy type of prime mover as shown I connect the motor 27 to actuate a valve 30 in a fluid supply conduit 30' through a suitable shaft and gearing 31.

The operation of the arrangement illustrated in Fig. 4 is substantially as follows: The series non-linear circuit is adjusted by means of the saturable inductance 11 to provide a critical region of frequency response within the normal speed of the prime mover 16. For purpose of illustration it will be assumed that this region is between 59 and 61 cycles for the pilot generator 18 and that 60 cycles corresponds to the normal speed of the prime mover. The steepness of the curve will also be adjusted by means of the resistance 13 so that the relay is energized to maintain a stable neutral or non-contact position at 60 cycles. This point of operation will be assumed to be the point N on the curve $E_c$ of Fig. 2. If it be assumed that the frequency increases a slight amount, the energization of the winding 25 will be abruptly decreased and the lever 23 of the contact-making voltmeter 19 will move to close contacts 21 and 22 so as to energize the motor 27 through field winding 29. For this connection the motor will be arranged to operate the valve 30 in a direction to decrease the speed of the prime mover. If the frequency decreases a slight amount from the assumed normal value of 60 cycles the energization of winding 25 will be abruptly increased and the lever 23 will move to close contacts 20 and 22 so as to energize motor 27 through field winding 28. For this connection the motor will operate in a direction to increase the speed of the prime mover.

In Fig. 5 I have illustrated a modification of the arrangement shown in Fig. 4 which employs a rectifying means 32 connected between the capacitance 12 of the non-linear circuit and the operating winding 25 of the contact-making voltmeter. The rectifying means 32 may be of any suitable type, for example, rectifiers of the dry or contact type such as are described in United States Letters Patent No. 1,640,335, granted August 23, 1927, upon an application of Lars O. Grondahl. The rectifying means may be of either the full wave or half wave type. In the circuit arrangement illustrated in Figs. 1 and 4, power is supplied to the relay mechanism at poor power factor whereas when the rectifier is employed as in the arrangement of Fig. 5, power is furnished at unity power factor with the result that the non-linear circuit may consist of smaller parts. Without the rectifier the varying position of the core sometimes causes objectionable changes in impedance in the network whereas with the rectifier these changes in impedance are absent because the rectifier insulates the non-linear circuit from impedance changes in the relay mechanism. When the rectifier is of the dry or contact surface type, the rectifier resistance is an appreciable part of the total resistance, the decrease in this resistance which characterizes dry rectifiers serves to limit the voltage applied to the relay winding under abnormal voltage conditions.

In Fig. 6 I have shown an application of an embodiment of my invention in a speed regulating system for a direct current motor. A direct current motor 33 is provided with brushes 34 through which energy is received from a supply circuit 35. The motor is provided with a shunt field winding 36 and a control winding 37 which acts differentially therewith as indicated by the arrows. Although a pilot generator of the type illustrated in Fig. 3 may be employed, I have shown an alternative arrangement wherein auxiliary slip rings 38 are provided in such a manner that an alternating voltage varying with frequency may be taken to energize the frequency responsive non-linear control circuit of the type illustrated in Fig. 1 comprising the saturable reactor 11, the capacitance 12 and the resistance 13. The field winding 37 is connected to be energized in accordance with the voltage across the capacitance 12 through suitable rectifying means 39 which as shown may be of the dry surface contact type as illustrated in Fig. 5.

The operation of the arrangement illustrated in Fig. 6 is substantially as follows: It will be assumed that the non-linear circuit is adjusted for speed and frequency conditions similarly to the arrangement illustrated in Fig. 4. Under these conditions the winding 37 will be energized by a current proportional to the voltage at the point N in the curve $E_c$ of Fig. 2. The net excitation of the motor 33 will be such as to cause the motor to operate at the normal speed. If the speed increases a slight amount the energization of the differential winding 37 is suddenly decreased so that the net excitation of the motor is increased and the speed is brought back to normal. On the other hand, if the speed decreases the excitation of the differential field winding 37 is suddenly increased so that the net excitation of the motor is decreased and the speed is brought back to normal.

The series non-linear circuit network which has been described in the foregoing arrangements is suitable for use with a source of frequency varying proportional to voltage but there are other applications where it is desirable to provide a frequency responsive means which is independent of variations of the voltage of the source.

In Fig. 7 I have illustrated an elementary circuit diagram of a non-linear network which is sensitive to changes in frequency and relatively insensitive to variations of voltage. This network comprises a branch circuit comprising a series connected saturable reactor 42 and a resistance 43 connected in parallel relation with a branch circuit comprising a capacitance 44 across an alternating source 10 through a load resistance 45.

If the load current $I_2$ through the resistance 45 is measured as a function of the applied voltage, the curves of Fig. 8 will be obtained wherein the applied voltage is taken as abscissæ and the load current as ordinates for three different frequencies $f_1$, $f_2$ and $f_3$. It may be seen that there is a region indicated by the arrows where a change in current with voltage is small or negligible, while a relatively large change in current with frequency exists. In the circuit of the type illustrated in Fig. 7 it was observed that the applied voltage may vary through limits of the order of ± 10% while the current change may be as small as a fraction of one per cent. However, when the frequency changes by 1%, a change in load current may be as large as 2 or 3%. Thus, when the circuit is supplied from a variable frequency, variable voltage source, the load current $I_2$, and hence the voltage across the load resistance 45 varies in frequency and voltage in the manner indicated, the percentage increase in voltage being greater than the percentage increase in frequency. This new voltage source, namely the voltage across the resistance 45 may be used to energize a circuit which is critical to this change of voltage and frequency. This property is had in a series non-linear circuit employing a capacitance, a resistance, and an inductance.

In Fig. 9 I have illustrated diagrammatically the complete circuit comprising the non-linear parallel network of Fig. 7 connected to energize a series-type of non-linear circuit comprising the resistance 13, the capacitance 12 and the saturable inductance 11 connected in series relation across the resistance 45 of the parallel network. A relay mechanism having an operating winding 40 may be connected either in series relation with the series type non-linear circuit, or in parallel relation with the resistor 13 as shown in Fig. 1, or as shown in this figure, in parallel relation with the capacitance 12. The current $I_3$ and hence the voltage across the resistance 13, or the voltage across the capacitance 12, varies critically with the source frequency but substantially independently of variations in the source voltage.

In Fig. 10, I have shown another embodiment of my invention which utilizes a series-parallel type of non-linear circuit for obtaining a frequency responsive means which is independent of voltage variations. The series-parallel branch circuit comprises a saturable reactor 41 connected in series relation with a parallel branch comprising two arms, one of which includes the saturable reactor 42 in series relation with the resistance 43 and the other of which includes the capacitance 44. The series-parallel branch circuit is connected in series relation with a resistance 45 across an alternating voltage source 18. A relay mechanism having an operating winding 46 is connected across the resistance 45.

For a certain region the current traversing the resistance 45 is constant in wave form and phase of its peak current through substantial variations in applied voltage. In Fig. 11 I have shown a characteristic curve plotted between the frequency of the supply as abscissæ and the current in the series circuit as ordinates for two cases (a) voltage varying proportional to frequency with observation points marked by a circle, and (b) voltage constant and frequency varying with observation points marked by an x. Within the limit of accuracy of measurement the two curves were found to coincide. It may be concluded, therefore, that for this circuit the series current is a function of frequency alone and is independent of voltage in the region under consideration. It may be seen that the current varies more rapidly than the frequency. Thus a 1% change in frequency changes the current by approximately 3% in the particular circuit under consideration. There is a portion of the curve between the arrows where the current tends to be both independent of voltage and frequency. It is to be noted that in this case as for the circuits previously discussed that the voltages and frequencies for which this behaviour is had may be adjusted between wide limits and that the phenomena depend upon the comparatively stable and reproducible saturation properties of the saturable inductances.

The frequency-sensitive voltage-independent series parallel circuit of Fig. 10, may be applied to the frequency control of the generator directly without the use of a pilot generator by connecting the control circuits of relay 46 in the speed control circuit of Fig. 4 as will be evident to those skilled in the art. The current in the output or relay circuit is in this case independent of generator voltage, and hence load, and varies as a function of generator speed and hence frequency alone. In those cases for which sufficient sensitivity to frequency changes is provided by the circuit illustrated in Fig. 10 the relay mechanism 46 may be energized directly in accordance with the series current. In those cases for which great sensitivity to frequency is required, the series-parallel type of non-linear circuit may be used in combination with a series-type of non-linear circuit as described below.

In Fig. 12 I have illustrated a modification of my invention utilizing the combination of a series-parallel non-linear circuit of Fig. 10 and a series type of non-linear circuit comprising a series connected resistance 13, a capacitance 12 and a saturable inductance 11 connected to be energized in accordance with the voltage drop across the resistance 45. The relay 46 is connected to be energized in accordance with the current traversing the series non-linear circuit and as shown is connected across the capacitance 12. Although this particular frequency-responsive circuit involves more component parts it makes available extreme sensitivity to change in frequency coupled with independence of voltage.

While I have shown and described particular embodiments of my invention it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, a source of variable frequency voltage, and an electric network connected to be energized from said source and including an inductance element variable with current and a capacitance element, said elements being so connected and having volt-ampere characteristics so correlated as to obtain a condition of non-linear resonance for producing an electric quantity in said network which changes abruptly at a critical frequency of said source, said critical frequency being at a value higher than the frequency corresponding to maximum current in said network.

2. A frequency-responsive means comprising an electric network including an inductance element variable with current and a capacitance element, said elements being so connected and having volt-ampere characteristics so correlated as to obtain a condition of non-linear resonance for producing an electric quantity in said network which varies abruptly at a critical frequency of applied voltage, said critical frequency being at a value higher than the frequency corresponding to maximum current in said network.

3. A frequency-responsive means comprising an electric network including a resistance, a capacitance and an inductance saturable within the operating range of said frequency responsive means, said saturable inductance being so connected and having a volt-ampere characteristic so correlated with respect to said resistance and capacitance as to obtain a condition of non-linear resonance for producing an electric quantity in said network which varies abruptly at a critical frequency of applied voltage, said critical frequency being at a value higher than the frequency corresponding to maximum current in said network.

4. In combination, a source of variable frequency voltage, and an electric network comprising a resistance, a capacitance and an inductance saturable within the operating range of the frequency variation of said source, the volt-ampere characteristic of said inductance being so correlated with the volt-ampere characteristic of said resistance and capacitance as to obtain a condition of non-linear resonance for producing an electric quantity in said network which changes abruptly at a critical frequency of said source, said critical frequency being at a value higher than the frequency corresponding to maximum current in said network.

5. In combination, an electric circuit, an electric network comprising a series-connected resistance, capacitance, and a closed-core inductance connected to be energized from said circuit, the volt-ampere characteristic of said inductance being correlated with the volt-ampere characteristic of said resistance and capacitance so that a condition of non-linear resonance is obtained for producing a current in said network which varies abruptly at a critical value of the frequency of said circuit, said critical value of the frequency of said circuit being higher than the value of frequency corresponding to maximum current in said network.

6. In combination, an electric circuit, an electric network comprising a series connected resistance, capacitance, and a closed-core inductance connected to be energized from said circuit, the volt-ampere characteristic of said inductance being correlated with the volt-ampere characteristic of said resistance and capacitance so that a condition of non-linear resonance is obtained for producing a current in said network which varies abruptly at a critical value of the frequency of said circuit, said critical value of the frequency of said circuit being higher than the value of frequency corresponding to maximum current in said network, and an electro-responsive means connected to be energized in accordance with the current in said network.

7. In combination, an electric circuit, an electric network comprising a resistance element, a capacitance element, and a saturable inductance element connected in series relation to be energized from said circuit, said saturable inductance being correlated with said resistance and capacitance so as to produce a current in said network which varies abruptly at a critical value of the frequency of said circuit, said critical value of the frequency of said circuit being higher than the value of frequency corresponding to maximum current in said network, and an electro-responsive means comprising a winding connected to be energized in accordance with the voltage drop across one of said elements.

8. In combination, an electric network including a capacitance element and an inductance element which has a reactance dependent upon current, said elements being so connected and having volt-ampere characteristics so correlated as to obtain a condition of non-linear resonance for producing an electric quantity in said network which varies abruptly at a critical value of an electrical characteristic of said network, an electric circuit having a variable impedance over its operating range with alternating current excitation sufficient to vary the point of critical response of said network, and means interposed between said electric circuit and said network for isolating said network from impedance changes in said electric circuit.

9. In combination, an electric circuit having an alternating voltage varying in proportion to frequency, a non-linear circuit including a capacitance and an inductance variable with current connected to be energized from said electric circuit and arranged for non-linear resonance at a critical frequency of said source, an electro-responsive means, an electromagnetic device connected to be energized from said network in accordance with said electric quantity and having a movable element causing upon movement thereof with alternating current excitation variation in the impedance of said device sufficient to vary the point of critical response of said network, and a rectifier interposed between said electromagnetic device and said network.

10. A frequency-responsive means comprising an electric network comprising a plurality of branch circuits each having a non-linear volt-ampere characteristic, and each including an inductance having a reactance dependent upon current and a capacitance, the volt-ampere characteristics of the inductance and capacitance elements of the respective branch circuits being so correlated in each branch circuit as to produce an electric quantity in one of said branch circuits which changes abruptly at a critical value of frequency and independently of variations in the voltage applied to said network.

11. In combination, an alternating-voltage circuit, a network comprising a branch circuit including a series connected resistance and saturable inductance connected in parallel relation with a branch circuit including a capacitance, a second resistance connected in series relation with said network across said alternating voltage circuit, and a series non-linear circuit comprising a resistance, a capacitance and a saturable inductance connected to be energized in accordance with the current traversing said second resistance.

12. A frequency-responsive electric circuit control means comprising a series-parallel non-linear branch circuit including a saturable inductance connected in series relation with a parallel branch circuit comprising two arms, one of which includes a second saturable inductance in series relation with a resistance and the other of which includes a capacitance, and a second resistance connected in series relation with said series-parallel branch circuit.

13. In combination, an alternating-voltage circuit, a network comprising a branch circuit including a series-connected resistance and saturable inductance connected in parallel relation with a branch circuit including a capacitance, a second resistance and a second saturable inductance connected in series relation with said network across said alternating voltage, and an electro-responsive means including a winding connected to be energized in accordance with the current traversing said second resistance.

14. A frequency-responsive electric-circuit control means comprising, a series-parallel non-linear branch circuit including a saturable inductance connected in series relation with a parallel branch circuit comprising two arms, one of which includes a second saturable inductance in series relation with a resistance and the other of which includes a capacitance, a second resistance connected in series relation with said series-parallel branch circuit, and a series non-linear circuit comprising a resistance, a capacitance and a saturable inductance connected to be energized in accordance with the current traversing said second resistance.

15. In combination, an alternating-voltage circuit, a network comprising a series-parallel non-linear branch circuit including a saturable inductance connected in series relation with a parallel branch circuit comprising two arms, one of which includes a second saturable inductance in series relation with a resistance and the other of which includes a capacitance, a second resistance connected in series relation with said series-parallel branch circuit, a series non-linear circuit comprising a third resistance, a second capacitance, and a third saturable inductance connected across said second resistance, and an electro-responsive means having a winding connected to be energized in accordance with the voltage across said third capacitance.

CHAUNCEY G. SUITS.

CERTIFICATE OF CORRECTION.

Patent No. 2,021,753.　　　　　　　　　　　　　　　November 19, 1935.

CHAUNCEY G. SUITS.

It is hereby certified that error appears in the printed specification of the above numbered patent requiring correction as follows: Page 2, second column, line 15, for "reasonable" read reasonably; page 4, second column, line 74, claim 5, and page 5, first column, line 13, claim 6, for "characteristic" read characteristics; and that the said Letters Patent should be read with these corrections therein that the same may conform to the record of the case in the Patent Office.

Signed and sealed this 18th day of February, A. D. 1936.

Leslie Frazer
(Seal)　　　　　　　　　　　　　　　　　　　　Acting Commissioner of Patents.